United States Patent [19]

Crombie

[11] Patent Number: 5,553,551
[45] Date of Patent: Sep. 10, 1996

[54] INTERLOCKING MODULAR BENCH SYSTEM

[76] Inventor: Terry Crombie, P.O. Box 458, Castle Rock, Minn. 55010

[21] Appl. No.: 111,441

[22] Filed: Aug. 25, 1993

[51] Int. Cl.$^6$ ............................................. A47B 3/00
[52] U.S. Cl. ................. 108/181; 297/232; 297/184.15; 297/440.2
[58] Field of Search ...................... 108/180, 181; 297/184.15, 184.1, 440.2, 232, 457.63

[56] References Cited

U.S. PATENT DOCUMENTS

| | | | |
|---|---|---|---|
| 1,383,771 | 7/1921 | Skidmore | 297/184.15 |
| 3,243,230 | 3/1966 | Otto | 297/184.15 |
| 3,256,533 | 6/1966 | Michelsen | 297/440.2 X |
| 3,896,531 | 7/1975 | Gorman | 297/440.2 X |
| 4,409,906 | 10/1983 | Alneng | 108/64 X |
| 4,621,865 | 11/1986 | Herrela | 297/184.15 X |
| 5,152,230 | 10/1992 | Licari | 108/181 X |

FOREIGN PATENT DOCUMENTS

| | | | |
|---|---|---|---|
| 425694 | 7/1948 | Italy | 297/184.1 |

*Primary Examiner*—Jose V. Chen
*Attorney, Agent, or Firm*—Gipple & Hale

[57] ABSTRACT

An interlocking modular bench system provides an inexpensive stable structure which can quickly be assembled to any desired size and a variety of configurations with minimal effort. Each basic bench unit requires only four fasteners for assembly and interlocks with adjacent bench units whose features can be varied as required. The system is particularly useful for commercial displays such as nursery stock and supplies. It is a further feature that two parallel rows of interlocking benches can form the side walls of an easily assembled covered structure with an interconnected frame supporting a light weight roofing material such as fabric or rigid, structural plastic sheet.

7 Claims, 5 Drawing Sheets

INTERLOCKING MODULAR BENCH SYSTEM

SUMMARY OF THE INVENTION

The present invention is directed to an interlocking modular bench system, which is especially characterized by flexibility, ease of assembly and ease of storage. The system of the invention allows for an unlimited number of units to be joined together in various configurations and variations and is especially well adapted for use with commercial displays such as for example, botanical specimens as are commonly found in nurseries and establishments which provide plants and nursery supplies.

BACKGROUND OF THE INVENTION

Particularly in establishments where the display of merchandise requires large open areas with substantial shelving or table surfaces, such as nurseries and similar establishments, it has commonly been the practice to assemble rows of benches upon which the merchandise could be displayed. Typically, such benches are large, heavy, and not well adapted either to disassembly, or to flexibility in arrangement. The weight and size of such bench units provides a constant impediment to arranging the units and available merchandise in the most advantageous manner for display. Further, on those occasions where some or all of these benches are no longer required, their storage in assembled configuration or disassembly have both proven to be a major problem.

Accordingly, there is a pressing need in these industries as well as in other situations for modular bench systems which can easily and quickly be set up or disassembled and arranged in a wide variety of configurations. Unfortunately, the few attempts which have been made to provide such modular systems have resulted in units which are often complex, difficult and time consuming to assemble, and unstable due to their method of fabrication and assembly as well as the materials used. As a result, such systems, while technically modular and intended to be adapted for disassembling and storage when not being used, have frequently proven to be no more suitable than the large heavy benches which they were designed to replace.

It is accordingly an object of the present invention to provide an inexpensive, light weight, stable modular bench system which avoids the problems of the prior art and provides an interlocking system of benches suitable for displaying merchandise or for other uses commonly associated with benches.

It is a further object of the present invention to provide an interlocking modular bench system which is both easy to fabricate, assemble, disassemble and store and which is adapted to be arranged in any of a wide variety of configurations and variations to suit the particular needs of the individual employing the units.

DETAILED DESCRIPTION OF THE INVENTION

In accordance with the present invention a modular bench system is provided which comprises one or more upright bench units which can be joined together in interlocking relationship to form an integrated system of benches containing any desired number of such units. Although the present invention contemplates several variations in the specific structure of the individual bench units, in its most essential form each bench unit consists of a pair of rectangular, opposing end sections which are joined together to form an individual bench unit by one or more horizontal planar members which extend between the respective end sections and a rectangular vertical stiffener which extends across the back of the bench unit to provide a rigid strong bench structure.

Each of the rectangular end sections consists of a pair of vertical upright legs which are joined together in parallel spaced relationship by parallel top and bottom horizontal cross pieces. The horizontal rectangular members which extend between the respective end sections interlock with the cross pieces of the end sections to form the bench unit and provide horizontal surfaces for work or display. Rigidity is provided to the structure by a rectangular stiffener which is attached vertically to the two rear legs of the bench unit.

As will become apparent, when two or more bench units are engaged together as contemplated, each pair of adjacent bench units will share a common end section, whose rear leg will support the adjacent ends of each stiffener.

The structure of the present invention along with various modifications and variations will however, be more fully appreciated by having specific reference to the drawings which describe the invention in its various embodiments.

Figure 1:
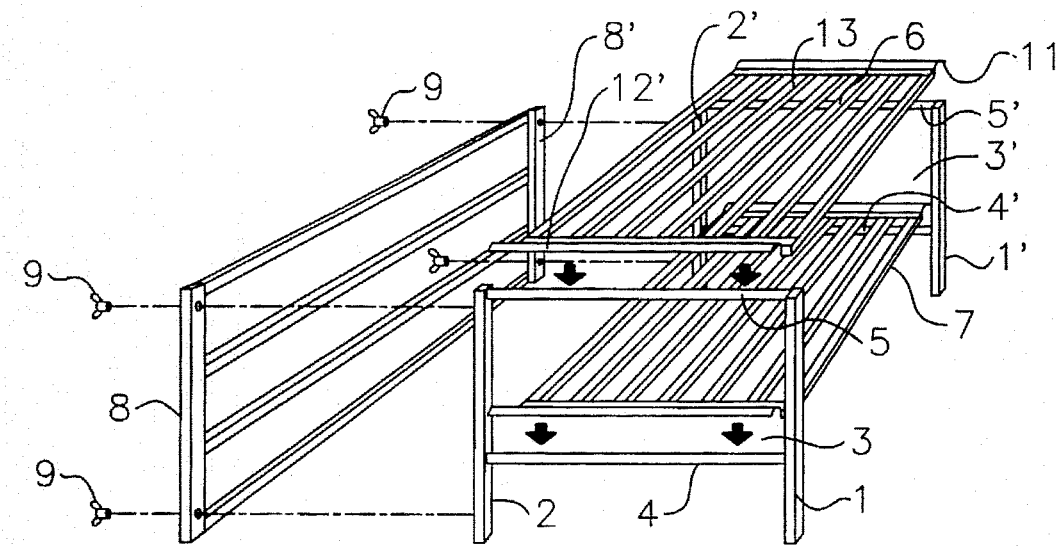
FIG. 1 is a perspective view illustrating assembly and structure of one embodiment of the present invention.

Directing attention initially to FIG. 1 of the drawings, two upright opposing rectangular end sections 3 and 3' are shown joined together in spaced relationship by horizontal top surface 6 and bottom horizontal surface 7. Each of the respective end sections 3 and 3' consist of pair of upright legs 1 and 2 and 1' and 2' joined together by top horizontal cross pieces 5 and 5' and bottom horizontal cross pieces 4 and 4' to form the generally rectangular end section. The rectangular horizontal planar members 6 and 7 which hold the respective end sections in upright spaced relationship consist of a plurality of elongated bars or members 13 which extent parallel to one another to engage respective transverse members 11 and 12 to form planar surfaces or shelves suitable for receiving articles or other material when the entire unit is assembled. The transverse members 11 and 12 are typically groved or slotted to fit over and engage the opposing horizontal cross pieces on the respective end sections of the unit and also to provide for interlocking engagement with an adjacent bench unit as illustrated in greater detail in FIG. 5 of the drawings and discussed above. In order to provide additional rigidity and strength to the unit, a rectangular stiffening section 8 which may consist of a plurality of horizontal members extending between two vertically standards 8 and 8' is bolted or otherwise attached to the two rear legs 2 and 2' of the respective end sections 3 and 3'. Thus it will be seen that assembly or disassembly of the basic bench unit requires only the placing of the two horizontal planar members into proper engagement with the opposing horizontal cross pieces of the two end sections and then attachment of the rectangular stiffening member by means of bolts to the back of the unit.

Figure 2:
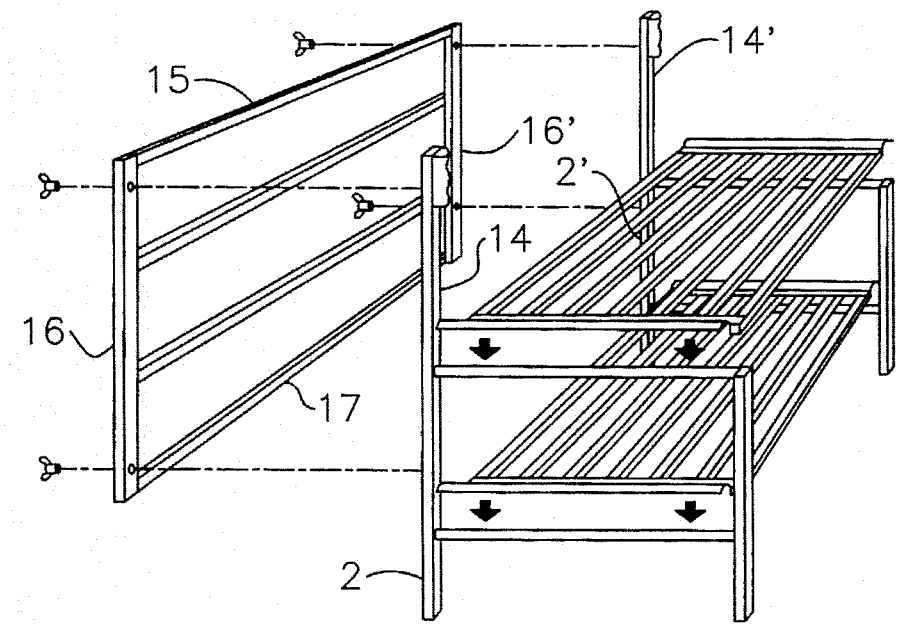
FIG. 2 is a perspective view illustrating assembly and structure of an additional embodiment of the present invention in which a fence is provided across the back of the work bench unit.

As shown in FIG. 2 of the drawings, an additional structure of the present invention consists essentially of the basic upright base unit in which the rear pair of legs 2 and 2' are extended at 14 above the top planar surface 6 to accommodate an enlarged rectangular stiffener 15 having a plurality of horizontal members 17 extending between the two upright members 16 and 16' and attached to the back of the unit by four bolts in the same manner as described in FIG. 1.

Figure 3:
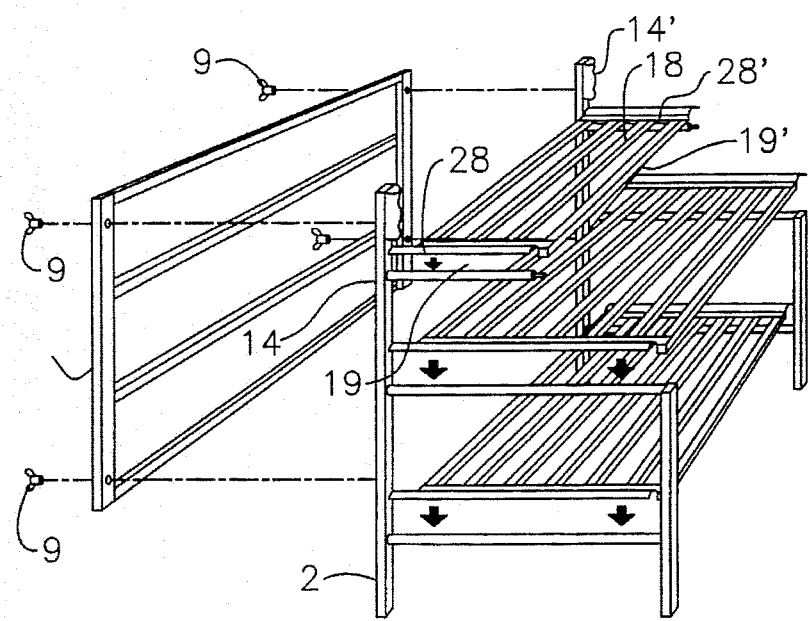
FIG. 3 illustrates in perspective yet another embodiment of the present invention in which a shelf unit is provided to the structure of FIG. 2.

In FIG. 3 of the drawings the structure of FIG. 2 is further enhanced by providing a pair of shelf supports 19 which attach in conventional manner to the two upright standards 14 and 14' to accommodate a horizontal shelf 18 consisting of a plurality of parallel horizontal members which extend between the two horizontal members 28 and 28' which are provided with grooves to facilitate their attachment to the horizontal members 19 and 19' respectively and also with any adjacent units having similar shelving.

Figure 4:
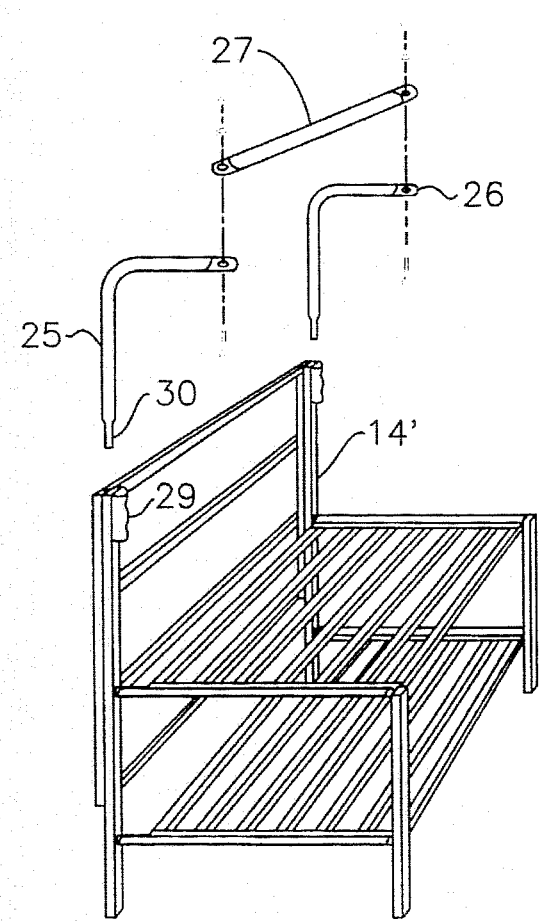
FIG. 4 illustrates an embodiment of the present invention in which a hanging rack is provided across the back of the bench structure.

As illustrated in FIG. 4 of the drawing, the upright members 14 can also be provided with sleeves 29 to receive inverted L-shaped hangers 25 and 26 having sections of reduced diameter 30 to engage the sleeve 29. A horizontal member conveniently extends between the two inverted L's 25 and 26 to provided a hanging bar useful for example for the display of hanging baskets or other articles.

Figure 5:
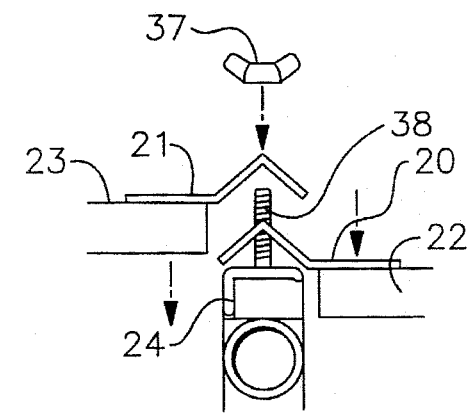
FIG. 5 illustrates in close up the interlocking relationship which attaches the respective units of the system together.

FIG. 5 of the drawings illustrates in greater detail the unique interlocking end channels which characterize the present invention and which permit the bench units to be joined together quickly and easily to form an integrated system. As shown in the figure, the two horizontal planar surfaces 22 and 23 are made up of a series of parallel elongated members which are transversely joined to one another by slotted cross pieces 20 and 21. These cross pieces have channels which extend out beyond the ends of the parallel elongated members making up the planar surface to form a groove which extends transverse to the elongated members. As earlier described, the groove fits over the horizontal member 24 to connect together the respective end sections of adjacent bench units. Each bench unit will have a common end section with the adjacent bench unit by engaging the grooved member 21 over top of the grooved member 20. The respective units are secured by a plurality of upright bolts 38 and wing nuts 37. As already noted, similar interlocking arrangements can be applied to adjacent shelving as illustrated in FIG. 3 of the drawings.

It will be appreciated that because only four bolts are required for each independent bench unit and in fact only two bolts where adjacent units are interlocked together with a common end section, the system of the present invention requires essentially no tools and very little time to assemble or disassemble for storage. Once the system is assembled alternating horizontal shelves can even be removed to permit display of large standing objects.

Figure 6:
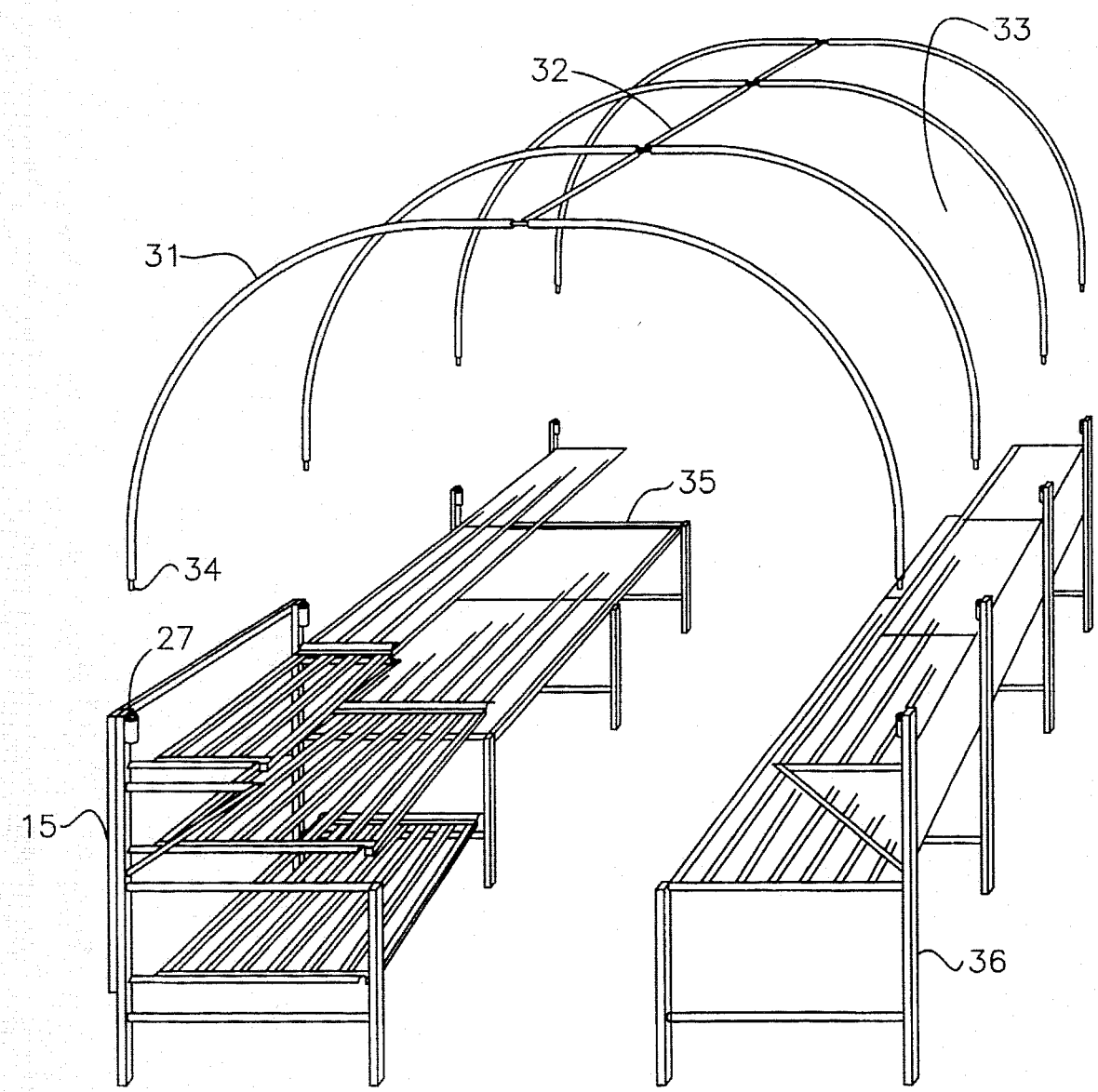
FIG. 6 is a perspective view illustrating two rows of interlocking benches connected by an overhead roof frame to form a covered structure.
Figure 7:
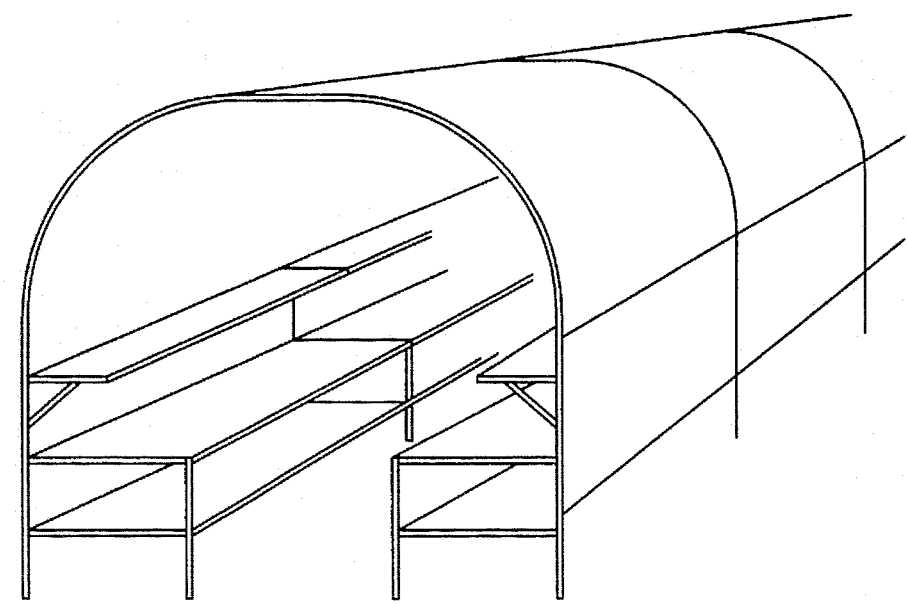
FIGS. 7–10 illustrate variations in various covered structure arrangements.
Figure 8:
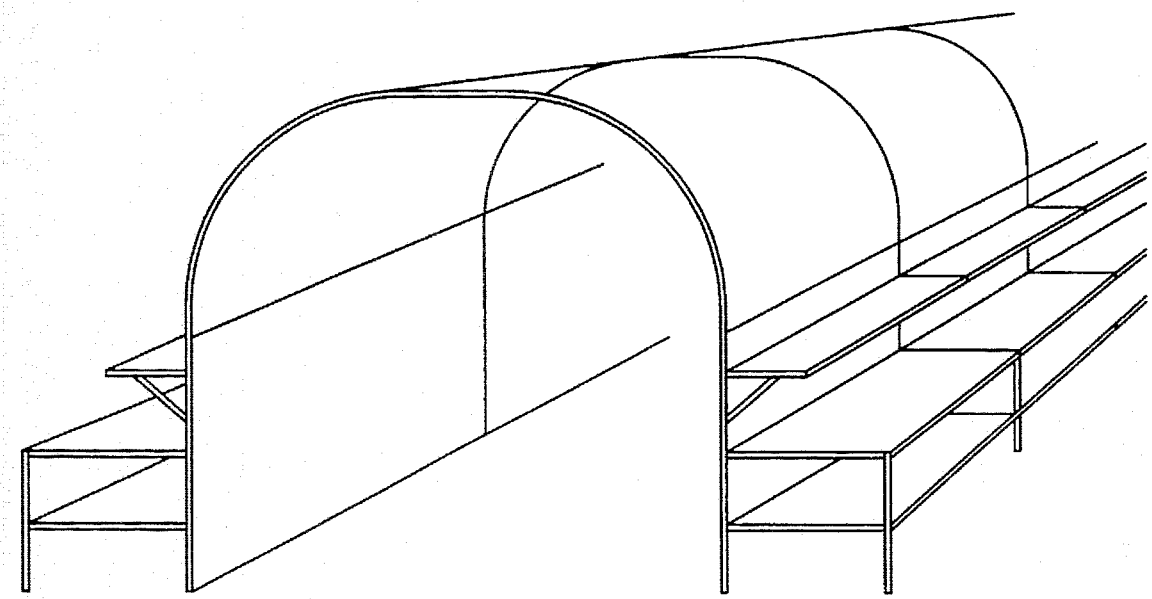
Figure 9:
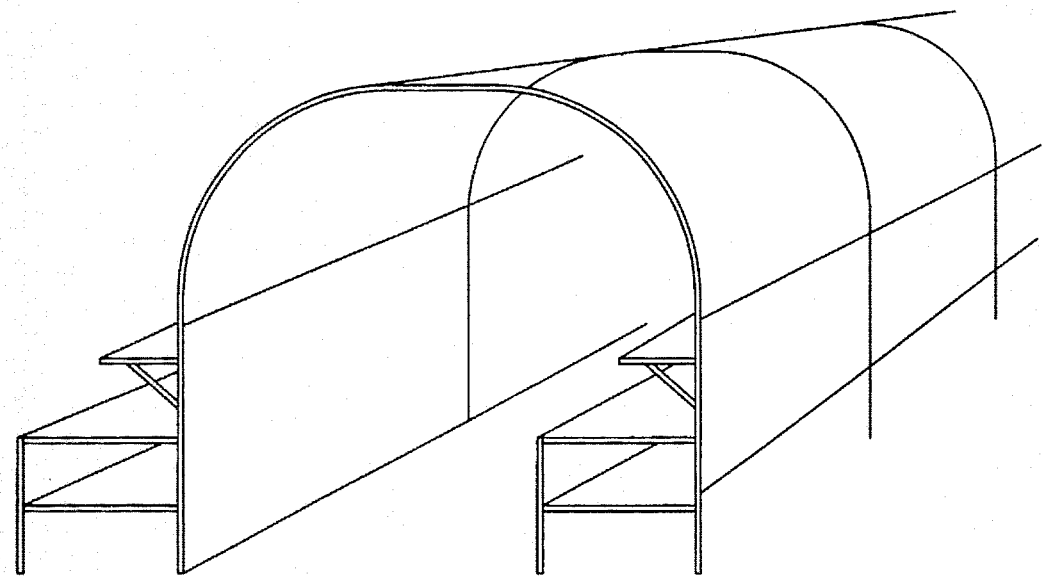
Figure 10:
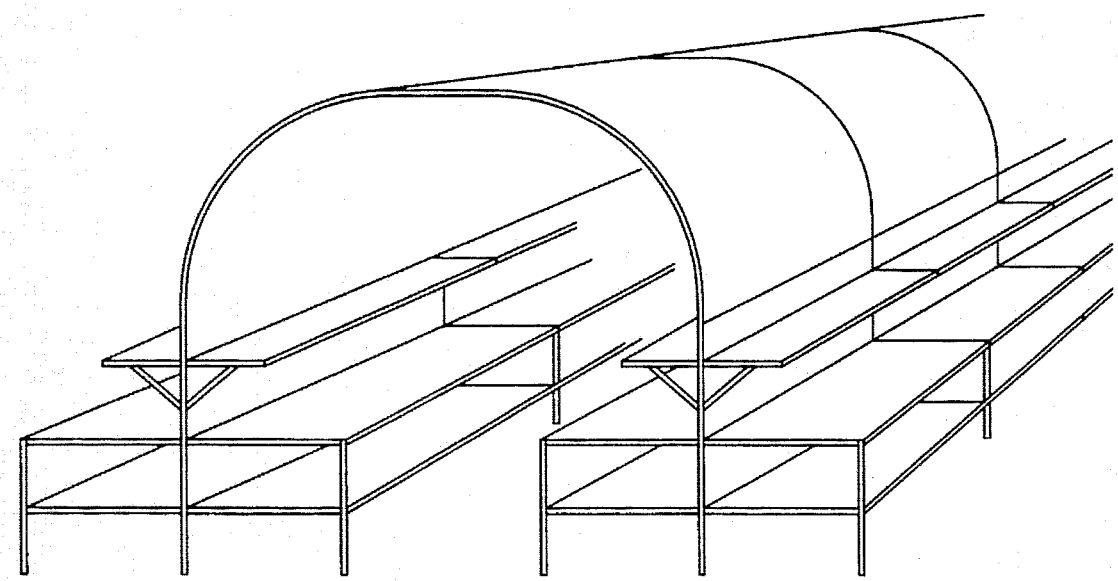

FIG. 6 of the drawings illustrates the unique manner in which two interlocking parallel rows of bench units, 35 and 36, can be connected together by a common roof 33 to form a covered structure. The roof is formed from a plurality of curved arches 31 which extend transversely between the respective bench rows 35 and 36. The arches, which can be tubular metal or other material have projections 34 at either end to engage sockets 29 in the bench sections. A common ridge pole 32 joins the arches and extends parallel to the respective bench rows.

After the arches are in place and a ridge purlin installed, a piece of plastic or fabric is stretched over the top creating a weather protected shelter. The fabric actually attached to the stiffener 15 on either side. This holds everything in place.

In addition, locking devices can be installed on the rear legs of the bench in such a way to facilitate installation of a front or a back on the greenhouse tunnel.

Also, it is important to note that the stiffener (with a locking device attached to one long end), can be installed either side up. This allows the user to bring the plastic merely down to the top of the bench or, by flipping the stiffener over, bring it down another three feet or almost to the ground. Additionally, although not shown in the drawings, the stiffener sections can be modified in a number of useful ways, such as by providing upper and lower horizontal tracks to accommodate sliding doors or windows to facilitate ventilation.

FIGS. 7–10 illustrate alternative arrangements of the bench units of the invention into covered structures.

While various materials can be employed in the system of the present invention, most advantageously metal is used because of its strength, durability and relative light weight. Most advantageously, galvanized or painted steel is preferred. It will also be appreciated that various modifications not specifically herein illustrated can be made in the system of the present invention to more readily adapt it to specific display situations, for example, netting may be extended across the back of the unit and, in some instances it may desirable to extend the horizontal shelves or planner surfaces more then two units vertically, for example, where storage is the primary consideration. In such instances it will be apparent that the respective end sections will extend to a greater height and be provided with additional horizontal cross pieces to support the additional horizontal surfaces extended between them. Further modifications and variations in the structure of the invention will also be apparent to those of ordinary skill in the art and are considered to fall within the scope of the invention as defined herein in the claims.

I claim:

1. A modular bench system usable as a display or work counter comprising a plurality of upright bench units, each comprising a pair of rectangular opposing end sections, each said end section consisting of a pair of vertical upright legs joined together in parallel spaced relationships by parallel top and bottom horizontal cross pieces and bottom cross pieces, opposing end sections being joined together by rectangular, planar members which extend between said respective cross pieces; two opposing sides of each of said planar members each forming a groove which engages one of said cross pieces; each of said bench units having at least one end section which it shares in common with an adjacent unit when assembled into said system and each of said units having an upright rectangular layer stiffening means attached between opposing legs on its end sections.

2. The bench system of claim 1 wherein an opposing leg on each of two joined end sections projects vertically above the planar member connecting the respective top cross pieces of said end sections to form upright standards.

3. The bench system of claim 2 wherein an inverted "L" shaped member extends vertically from the top of said standard to form horizontal hangers.

4. The bench system of claim 3 wherein a horizontal elongated member extends between a pair of said inverted "L" shaped members.

5. The bench system of claim 2 wherein one or more shelves extend between said standards.

6. The bench system of claim 1 wherein said planar members consist of a plurality of spaced, parallel elongated members which are joined at their respective ends to said opposing sides to form said groove.

7. A modular building structure comprising two spaced, parallel rows of interconnected bench units joined by a roof structure extending between said units, each of said bench units comprising a pair of rectangular opposing end sections, each said end section consisting of a pair of vertical upright legs joined together in parallel spaced relationships by parallel top and bottom horizontal cross pieces and bottom cross pieces, said opposing and sections being joined together by rectangular, planar members which extend between said respective cross pieces; two opposing sides of each of said planar members each forming groove which engages one of said cross pieces; each of said bench units having at least one end section which it shares in common with an adjacent unit when assembled into said system; and each of said units having an upright rectangular layer stiffening means attached between opposing legs on its end sections; said roof structure comprising a plurality of spaced, parallel joists which extend transverse to said rows of bench units and which are joined thereto at their ends, and a ridge pole extending parallel to said rows of bench units and connected to said joists.

* * * * *